United States Patent
Amit et al.

(10) Patent No.: US 9,971,896 B2
(45) Date of Patent: *May 15, 2018

(54) TARGETED SECURITY TESTING

(75) Inventors: Yair Amit, Tel-Aviv (IL); Lotem Guy, Hod Hasharon (IL); Daniel Kalman, Tel-Aviv (IL); Ori Segal, Tel-Aviv (IL); Omri Weisman, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 633 days.

This patent is subject to a terminal disclaimer.

(21) Appl. No.: 13/341,426

(22) Filed: Dec. 30, 2011

(65) Prior Publication Data

US 2013/0174260 A1   Jul. 4, 2013

(51) Int. Cl.
*G06F 21/00*   (2013.01)
*G06F 21/57*   (2013.01)

(52) U.S. Cl.
CPC ...... *G06F 21/577* (2013.01); *G06F 2221/033* (2013.01)

(58) Field of Classification Search
CPC .................. G06F 2221/033; G06F 21/577
USPC ................. 726/22–25; 713/165–167
See application file for complete search history.

(56) References Cited

U.S. PATENT DOCUMENTS

| | | | |
|---|---|---|---|
| 7,210,135 B2* | 4/2007 | McCrady et al. ............ | 717/140 |
| 7,752,609 B2 | 7/2010 | Rioux | |
| 7,761,917 B1* | 7/2010 | Kumar ................ | H04L 63/0263 |
| | | | 726/23 |
| 7,779,399 B2 | 8/2010 | Huang et al. | |
| 7,779,472 B1* | 8/2010 | Lou ........................ | G06F 21/566 |
| | | | 726/22 |
| 8,713,683 B2* | 4/2014 | Moore .................... | G06F 21/85 |
| | | | 713/187 |
| 2006/0069714 A1 | 3/2006 | Blount et al. | |
| 2006/0195588 A1 | 8/2006 | Pennington et al. | |
| 2007/0074188 A1 | 3/2007 | Huang et al. | |
| 2008/0256638 A1 | 10/2008 | Russ et al. | |

(Continued)

FOREIGN PATENT DOCUMENTS

CN   101385033 A   3/2009
CN   101814053 A   8/2010

(Continued)

OTHER PUBLICATIONS

Raffelt et al., "Hybrid Test of Web Applications with Webtest," TAV-WEB—Workshop on Testing, Analysis and Verification of Web Software, Jul. 21, 2008, pp. 1-7.

(Continued)

*Primary Examiner* — Kambiz Zand
*Assistant Examiner* — Tongoc Tran
(74) *Attorney, Agent, or Firm* — Brian J. Colandreo, Esq.; Jeffrey T. Placker, Esq.; Holland & Knight LLP

(57) ABSTRACT

Source code of a plurality of web pages including script code is statically analyzed. A page including a potential vulnerability is identified based on the static analysis. A page not including a potential vulnerability is identified based on the static analysis. The web page including the potential vulnerability is dynamically analyzed using a set of test payloads. The page not including the potential vulnerability is dynamically analyzed using a subset of the set of test payloads, the subset including fewer test payloads than the set of test payloads.

16 Claims, 3 Drawing Sheets

(56) References Cited

U.S. PATENT DOCUMENTS

| | | |
|---|---|---|
| 2008/0307524 A1 | 12/2008 | Singh et al. |
| 2009/0204591 A1* | 8/2009 | Kaksonen ........... G06F 11/3684 |
| 2010/0058475 A1* | 3/2010 | Thummalapenta . H04L 63/1433 726/25 |
| 2010/0115615 A1* | 5/2010 | Hubbard et al. ................ 726/22 |
| 2010/0169974 A1 | 7/2010 | Calendino et al. |
| 2010/0192222 A1 | 7/2010 | Stokes et al. |
| 2010/0235909 A1* | 9/2010 | Eynon et al. ................... 726/22 |
| 2011/0030061 A1 | 2/2011 | Artzi et al. |
| 2011/0078798 A1* | 3/2011 | Chen ..................... G06F 21/577 726/25 |
| 2011/0173693 A1 | 7/2011 | Wysopal et al. |
| 2011/0231936 A1 | 9/2011 | Williams et al. |
| 2012/0017274 A1* | 1/2012 | Schrecker ....................... 726/22 |
| 2012/0047581 A1* | 2/2012 | Banerjee et al. ............... 726/24 |
| 2012/0110551 A1 | 5/2012 | Fink et al. |
| 2012/0159621 A1* | 6/2012 | Jeong et al. .................... 726/22 |
| 2012/0215757 A1 | 8/2012 | Weisman et al. |
| 2013/0007885 A1 | 1/2013 | Haviv et al. |
| 2013/0042319 A1* | 2/2013 | Lin ................................. 726/22 |
| 2013/0111594 A1 | 5/2013 | Amit |
| 2013/0205397 A1 | 8/2013 | De Barros et al. |

FOREIGN PATENT DOCUMENTS

| | | |
|---|---|---|
| CN | 102077201 A | 5/2011 |
| JP | 2008502046 A | 1/2008 |
| JP | 2010262609 A | 11/2010 |
| WO | 2009095741 A1 | 8/2009 |

OTHER PUBLICATIONS

Monga et al., "A Hybrid Analysis Framework for Detecting Web Application Vulnerabilities," Software Engineering for Secure Systems, 2009, Issue Date: May 19, 2009, pp. 1-8.

Balzarotti et al., "Saner: Composing Static and Dynamic Analysis to Validate Sanitization in Web Applications," IEEE Symposium on Security and Privacy, 2008, pp. 1-15.

Lin et al., "An Automated Mechanism for Secure Input Handling," Journal of Computers, vol. 4, No. 9, Sep. 2009, pp. 837-844.

International Search Report dated Apr. 25, 2013 (Apr. 25, 2013) for PCT application No. PCT/IB2012/056919, pp. 1-12.

Examination Report dated Feb. 13, 2015 received in GB1408612.8, pp. 1-3.

Examination Report dated Aug. 26, 2015 received in GB1408612.8, pp. 1-4.

Khoury et al., "An Analysis of Black-Box Web Application Security Scanners Against Stored SQL Injection," 2011 IEEE Third International Conference on social computing (SocialCom), Boston MA, USA Oct. 9-11, 2011, pp. 1-9.

\* cited by examiner

TARGETED SECURITY TESTING

BACKGROUND OF THE DISCLOSURES

Client-side scripting languages allow for the creation and implementation of computer programs that may be received over a network and executed on a client computing device, for example by a web browser running on the client computing device. In some instances, client-side scripts allow for dynamic web content, in which web pages can have changing content depending on user input, environmental conditions, or other variables.

Web application may utilize client-side scripting to provide applications that can be executed within a web browser application on a client computing device. Web applications may allow functionality and operation of applications to be moved to the client computing device, rather than residing strictly with the server computing device. As web applications may often be executed within a web browser, the web applications may be compatible across many operating system platforms. This may obviate the need of the application developer to create different versions of the application for different client-types.

SUMMARY OF THE DISCLOSURE

According to an implementation, a method may include statically analyzing, on a computing device, source code of a plurality of web pages including script code. A web page may be identified including a potential vulnerability based on the static analysis. A web page not including a potential vulnerability may be based on the static analysis. The web page including the potential vulnerability may be dynamically analyzed using a set of test payloads. The web page not including the potential vulnerability may be dynamically analyzed using a subset of the set of test payloads, the subset including fewer test payloads than the set of test payloads.

One or more of the following features may be included. The plurality of web pages may be received from a web server. The plurality of web pages may be associated with a web application.

Statically analyzing the source code of the plurality of web pages may include building a model representing a flow of data through the source code of the plurality of web pages. The potential vulnerability may include a data-flow violation based on a set of security rules. Statically analyzing the source code of the plurality of web pages may include static taint analysis. Dynamically analyzing may include executing the script code on a script engine.

According to another implementation, a computer program product includes a computer readable medium having a plurality of instructions stored on it. When executed by a processor, the instructions may cause the processor to perform operations including statically analyzing source code of a plurality of web pages including script code. A web page including a potential vulnerability may be identified based on the static analysis. A web page not including a potential vulnerability may be identified based on the static analysis. The web page including the potential vulnerability may be dynamically analyzed using a set of test payloads. The web page not including the potential vulnerability may be dynamically analyzed using a subset of the set of test payloads, the subset including fewer test payloads than the set of test payloads.

One or more of the following features may be included. Instructions may be included for receiving the plurality of web pages from a web server. The plurality of web pages may be associated with a web application.

The instructions for statically analyzing the source code of the plurality of web pages, may include instructions for building a model representing a flow of data through the source code of the plurality of web pages. The potential vulnerability may include a data-flow violation based on a set of security rules.

The instructions for statically analyzing the source code of the plurality of web pages may include instructions for static taint analysis. The instructions for dynamically analyzing may include instructions for executing the script code on a script engine.

According to yet another implementation, a system may include a processor and a memory coupled with the processor. A first software module may be deployed in the memory and executed on the processor. The first software module may be configured to statically analyze source code of a plurality of web pages including script code. A second software module may be deployed in the memory and executed on the processor. The second software module may be configured to identify a web page including a potential vulnerability based on the static analysis. A third software module may be deployed in the memory and executed on the processor. The third software module may be configured to identify a web page not including a potential vulnerability based on the static analysis. A fourth software module may be deployed in the memory and executed on the processor. The fourth software module may be configured to dynamically analyze the web page including the potential vulnerability using a set of test payloads. A fifth software module may be deployed in the memory and executed on the processor. The fifth software module may be configured to dynamically analyze the web page not including the potential vulnerability using a subset of the set of test payloads, the subset including fewer test payloads than the set of test payloads.

One or more of the following features may be included. A sixth software module may be configured to receive the plurality of web pages from a web server. The plurality of web pages may be associated with a web application.

The first software module, configured to statically analyzing the source code of the plurality of web pages, may be configured to build a model representing a flow of data through the source code of the plurality of web pages. The potential vulnerability may include a data-flow violation based on a set of security rules.

The first software module configured to statically analyze the source code of the plurality of web pages, may be configured to conduct static taint analysis. The fourth software module, configured to dynamically analyze, may be configured to execute the script code on a script engine.

The details of one or more implementations are set forth in the accompanying drawings and the description below. Other features will become apparent from the description, the drawings, and the claims.

DETAILED DESCRIPTION OF THE INVENTION

Figure 1:
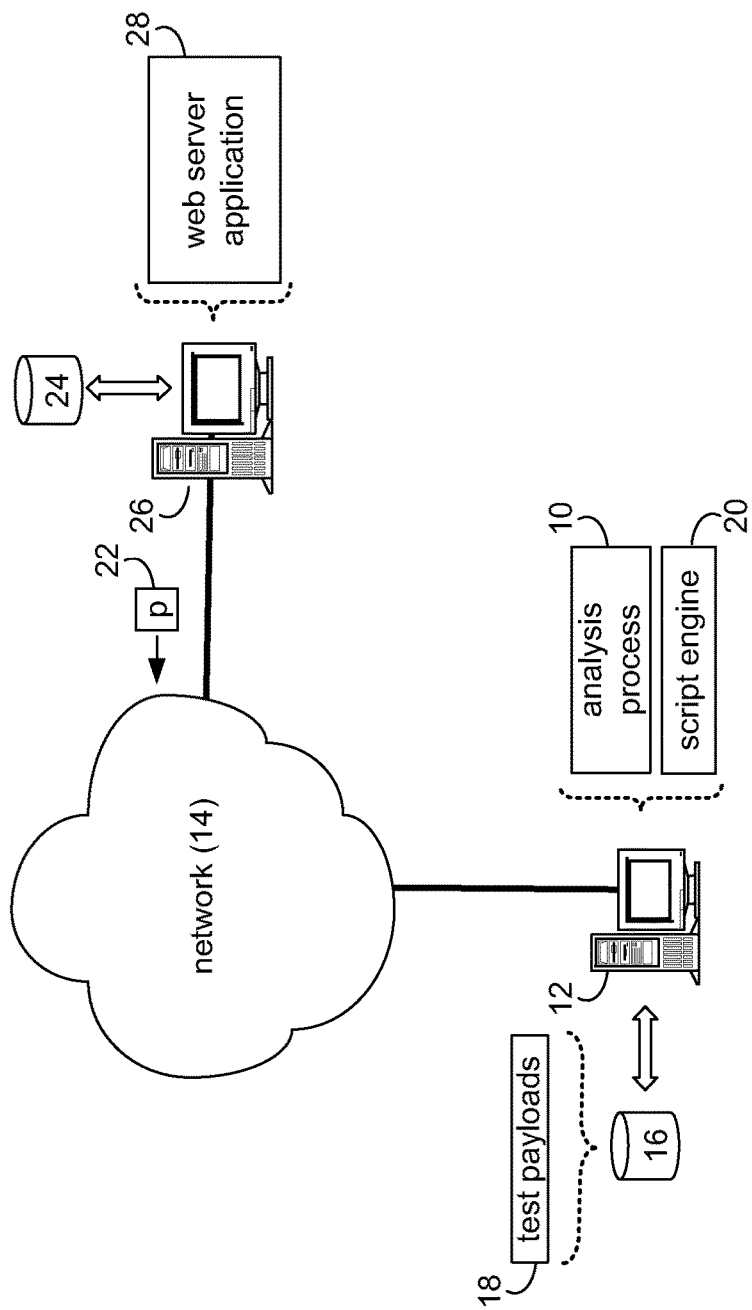
FIG. 1 diagrammatically depicts an analysis process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown analysis process 10 that may reside on and may be executed by client computer 12, which may be connected to network 14 (e.g., the Internet or a local area network). Examples of client computer 12 may include, but are not limited to, a personal computer, a laptop computer, mobile computing device, a server computer, or a series of server computers. Client computer 12 may execute an operating system, for example, but not limited to Microsoft® Windows®; Mac® OS X®; or Red Hat® Linux®, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both.)

As will be discussed below in greater detail, analysis process 10 may statically analyze source code of a plurality of web pages including script code. The script code may include code written in a script language, for example, but not limited to, JavaScript® and Flash® (JavaScript is a trademark of Oracle Corporation in the United States, other countries, or both; Flash is a trademark of Adobe Systems Incorporated in the United States, other Countries, or both). Based on, at least in part, statically analyzing the sources, analysis process 10 may identify a web page including a potential vulnerability and a web page not including a potential vulnerability. Analysis process 10 may dynamically analyze the web page including the potential vulnerability using a set of test payloads. Further, analysis process 10 may dynamically analyze the web page not including the potential vulnerability using a subset of the set of test payloads, in which the subset of test payloads includes fewer test payloads than the set of test payloads.

Consistent with the foregoing, analysis process 10 may generally statically analyze a plurality of web pages including script code to identify pages including script code as being a potential security vulnerability, and to identify pages that are not a potential security vulnerability, in view of the static analysis. The web pages may also be dynamically analyzed to identify potential security vulnerabilities. Web pages that were not identified by the static analysis a being a potential security vulnerability may be dynamically analyzed using a subset of test payloads, e.g., which may be directed at identifying more common security vulnerabilities. Web pages that were identified by the static analysis as being a potential security vulnerability may be dynamically analyzed using a more expansive, in some embodiments a significantly more expansive, set of test payloads than were utilized for dynamically analyzing the web pages that were not identified as being a potential security vulnerability by the static analysis.

The instruction sets and subroutines of analysis process 10, which may include one or more software modules, and which may be stored on storage device 16 coupled to client computer 12, may be executed by one or more processors (not shown) and one or more memory modules (not shown) incorporated into client computer 12. Storage device 16 may include but is not limited to: a hard disk drive; a solid state drive, a tape drive; an optical drive; a RAID array; a random access memory (RAM); and a read-only memory (ROM).

One or more sets of test payloads 18, e.g., which may be used in connection with dynamically analyzing the plurality of web pages, may be stored on storage device. 16. Script engine 20 may also be executed by client computer 12. Script engine 20 may include an engine configured to execute script code included with the plurality of web pages (e.g., within web pages 22). Script engine 20 may include a script engine included within and/or as a module of a web browser (e.g., which may be capable of rendering and/or processing web content and execute script code) and/or may include a stand-alone script engine that may be configured to execute script code included within web pages 22. The instruction sets and subroutines of script engine 20, which may include one or more software modules, and which may be stored on storage device 16 coupled to client computer 12, may be executed by one or more processors (not shown) and one or more memory modules (not shown) incorporated into client computer 12. In some embodiments, script engine 20 may include a separate application and/or may include a component of analysis process 10.

Web pages 22 may be stored on storage device 24 coupled to server computer 26. One or more of web pages 22 may include script code, which may be executed on client computer 12 (e.g., by script engine 20). Storage device 24 may include, but is not limited to, a hard disk drive; a solid state drive, a tape drive; an optical drive; a RAID array; a random access memory (RAM); and a read-only memory (ROM). Examples of server computer 26 may include, but are not limited to: a personal computer, a server computer, a series of server computers, a mini computer, and a mainframe computer. Server computer 26 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

Server computer 12 may execute web server application 28, examples of which may include but are not limited to: Microsoft IIS, Novell Webserver™, or Apache® Webserver, that allows for HTTP (i.e., HyperText Transfer Protocol) access to server computer 26 via network 14 (Webserver is a trademark of Novell Corporation in the United States, other countries, or both; and Apache is a registered trademark of Apache Software Foundation in the United States, other countries, or both). The instruction sets and subroutines of web server application, which may be stored on storage device 24, may be executed by one or more processors (not shown) and one or more memory modules (not shown) incorporated into server computer 26. In addition/as an alternative, the web server application may be stored on and executed by client computer 12.

Client computer 12 may be directly or indirectly coupled to network 14. For example, client computer 12 is shown directly coupled to network 14 via a hardwired network connection. In various additional/alternative embodiments, client computer 12 (and/or server computer 26) may be coupled to network 14 via a wireless communication channel established between client computer 12 (and/or server computer 26). Examples of a wireless communication channel may include an IEEE 802.11a, 802.11b, 802.11g, Wi-Fi, and/or Bluetooth wireless communication channel. As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
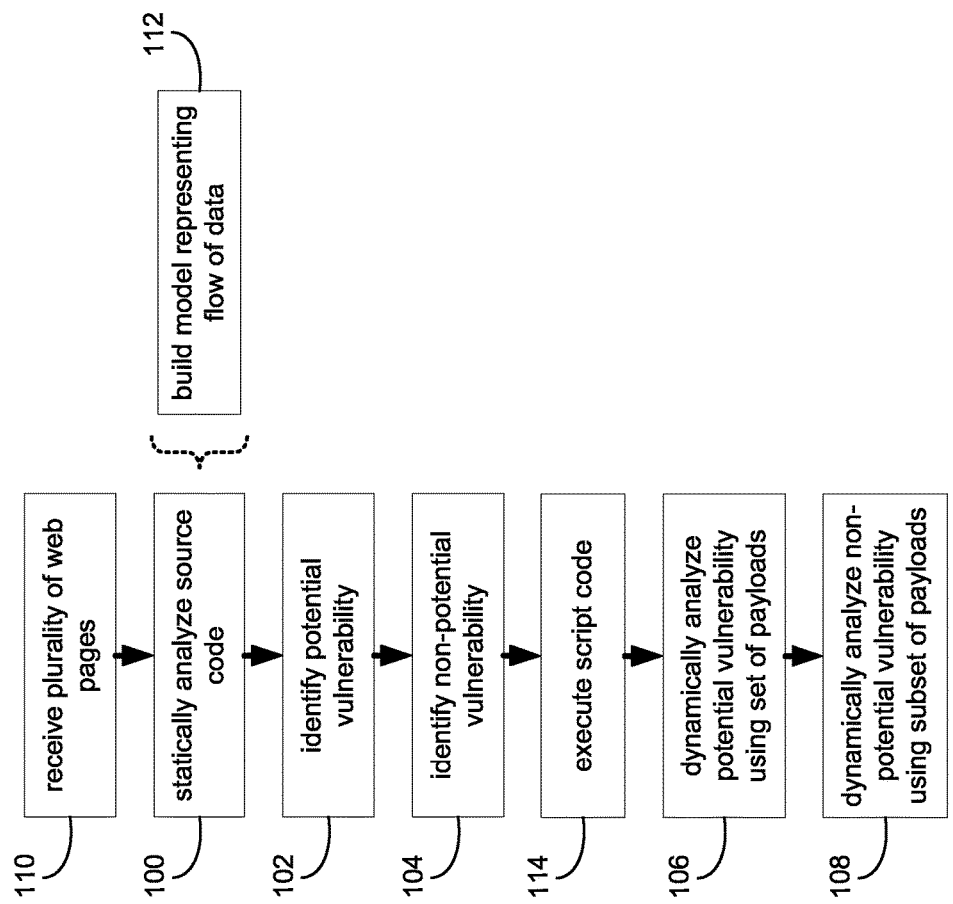
FIG. 2 is a flowchart of a process executed by the analysis process of FIG. 1.

Referring also to FIG. 2, analysis process 10 may generally statically analyze 100 source code of a plurality of web pages including script code. Analysis process 10 may identify 102 one, or more than one, web pages including a potential vulnerability based on the static analysis 100. Analysis process 10 may also identify 104 one, or more than one, web pages not including a potential vulnerability based on the static analysis. Further, analysis process 10 may dynamically analyze 106 the one, or more than one, web page including the potential vulnerability using a set of test payloads. The one, or more than one, web pages not including the potential vulnerability may be dynamically analyzed 108 using a subset of the set of test payloads, in which the subset including fewer test payloads than the set of test payloads.

Figure 3:
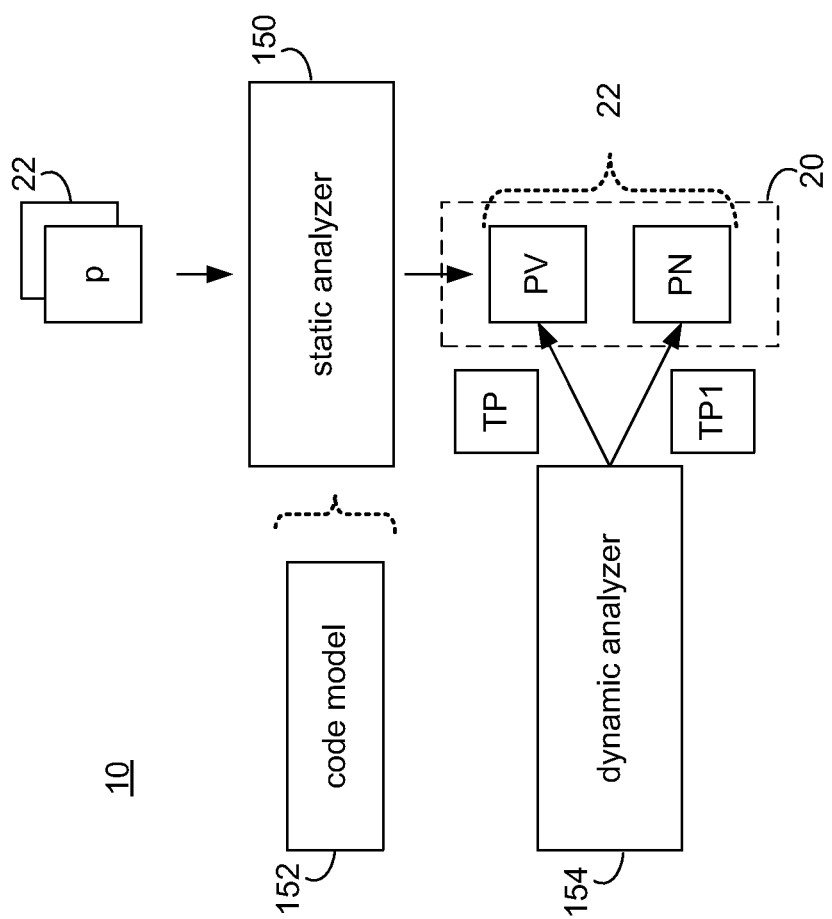
FIG. 3 diagrammatically depicts an analysis by the analysis process of FIG. 1 indicating an estimated arrival time of a meeting invitee.

For example, and referring also to FIG. 3, analysis process 10 may receive 110 a plurality of web pages 22 from server computer 26. The plurality of web pages 22 received 110 from server computer 26 may include one or more pages including script code, such as JavaScript, Flash, or other script code. In some examples, the plurality of web pages 22 may include web pages that are associated with a web application.

Statically analyzing 100 source code of the plurality of web pages including script code (e.g., by static analyzer 150, which may represent functionality of analysis process 10, and/or modules, features, or components of analysis process 10) may, in some embodiments, include building 112 a model 152 of the script code representing a flow of information and data through the source code of web pages 22 and/or script code included within web pages 22.

Utilizing code model 152, static analyzer 150 may identify 102 one, or more than one, web pages including a potential vulnerability (e.g., web page PV). For example, identifying 102 one, or more than one, web pages including a potential vulnerability may include identifying a data-flow violation within code model 152. In some embodiments, the data-flow violation may be based upon a set of security rules that my identify one or more behaviors associated with a potential vulnerability. In some embodiments, statically analyzing 100 the source code of web pages 22 may include static taint analysis.

Statically analyzing 100 the source code of web pages 22 may be a relatively fast process, as, in some embodiments, statically analyzing 100 the source code of web pages 22 may examine code model 152. For example, analysis process 10 (e.g., via static analyzer 150) may simulate different payload types and identify 102 that a theoretical example of vulnerability or exploit exists in the script code. As such, analysis process 10 may determine that a payload of a general type could potentially pose a vulnerability. However, the static analysis may represent an abstraction using generic payloads, not including specific parameters and/or features. As such, in some embodiments, analysis process 10 may not determine an exact payload that would cause the potential vulnerability, based on statically analyzing 100 the source code of the script, and may be prone to false positives in identifying 102 web pages including a potential vulnerability.

In a similar manner, statically analyzing 100 the source code of web pages 22 may identify 104 one, or more than one, web pages not including a potential vulnerability. The one, or more than one, web pages not including a potential vulnerability may include all web pages that were not identified 102 as including a potential vulnerability. In some embodiments, analysis process 10 may flag each of web pages 22 as either including a potential vulnerability or not including a potential vulnerability.

Analysis process 10 may dynamically analyze 106, 108 web pages 22, that have been statically analyzed 100. For example, analysis process 10 may dynamically analyze 106 the one, or more than one, web pages identified 102 has including a potential vulnerability (e.g., web page PV) and may dynamically analyze 108 the one, or more than one, web paged identified 104 as not including a potential vulnerability (e.g., web page PN), based on the static analysis 100. In some embodiments, web pages 22 may be dynamically analyzed 106, 108 by dynamic analyzer 154, which may, for example, represent functionality of analysis process 10, and/or modules, features, or components of analysis process 10.

Is some embodiments, dynamically analyzing 106, 108 web pages 22 may include executing 114 the script code on script code engine 20. As discussed above, script code engine 20 may include a stand-alone script code engine, may include functionality, or a module, component, or the like of a web browser that may interact with analysis process 10, and/or may include functionality, or a module, component, or the like of analysis process 10. In general, dynamically analyzing 106, 108 web pages 22 may include requesting web pages 22 and executing web pages 22 with various different test payload (e.g., test payloads 18). As such, analysis process 10 may execute the scripts included within web pages 22 with different test payloads. Further, analysis process 10 may observe behaviors of web pages 22 (and/or scripts included within web pages 22), wherein certain behaviors may indicate a vulnerability associated with a given web page (and/or the script included within the web page).

Dynamically analyzing 106 the one or more web pages PV including the potential vulnerability may include analyzing 106 the one or more web pages PV using a set of test payloads TP. In some embodiments, the set of test payloads TP may include tens or hundreds (e.g., between about 100-200 test payloads per parameter examined in some embodiments) of test payloads. Analysis process 10 may observe behaviors of the one or more web pages PV (and/or scripts included within web pages PV) for behaviors indicating a vulnerability. While, generally, dynamically analyzing 106 web pages using a relatively large number of test payloads may be a relatively time consuming process, in some embodiments relatively few web pages PV may be identified including potential vulnerabilities, the time associated with dynamically analyzing 106 the web pages PV including potential vulnerabilities may acceptable.

Dynamically analyzing 108 the one or more web pages PN not including the potential vulnerability may include dynamically analyzing 108 the one or more web pages PN using a subset TP1 of the set of test payloads TP. The subset of test payloads TP1 may include fewer test payloads than the set of test payloads TP. For example, in some embodiments the one or more web pages PN may be dynamically tested 108 for common sources of vulnerabilities. In some such embodiments, the subset TP1 of test payloads may include one to ten test payloads per parameter tested (e.g., in some embodiments, four test payloads per parameter tested).

In some embodiments, static analysis may be employed to inform dynamic analysis. That is, in some embodiments, of the web pages tested a relatively small number may be identified by the static analysis as including a potential vulnerability. The relatively small number of web pages identified as including a potential vulnerability may be thoroughly tested using a relatively large number of test payloads. Web pages not identified as including a potential vulnerability may be dynamically analyzed using a relatively smaller number of test payloads. Accordingly, while dynamically analyzing with a large number of test payloads may be relatively time consuming, as only a relatively small number of web pages (i.e., those identified as including a potential vulnerability) may be extensively dynamically analyzed, with those web pages not identified as including a potential vulnerability may be dynamically analyzed using relatively fewer test payloads. Therefore, in some embodiments, the dynamic analysis, and/or the magnitude of the dynamic analysis, may be targeted (e.g., to those web pages identified as including a potential vulnerability). Further, in some embodiments, extensively dynamically analyzing web pages identified as including a potential vulnerability (e.g., via static analysis) may verify if a vulnerability in fact exists (e.g., as opposed to a false positive and/or a theoretical vulnerability) and how to reproduce the vulnerability (e.g., based on the dynamic analysis). Further, in some embodiments, in which the vulnerability may be verified, the aspects of the source code of the script may be identified based on the static analysis.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product comprising a non-transitory computer readable medium having a plurality of instructions stored thereon, which, when executed by a processor, cause the processor to perform operations including:
   statically analyzing source code of a plurality of web pages including script code;
   identifying a first web page of the plurality of web pages as including a potential vulnerability based on the static analysis;
   identifying a second web page of the plurality of web pages as not including a potential vulnerability based on the static analysis;
   flagging, based on the static analysis, the first web page of the plurality of web pages as including the potential vulnerability;
   flagging, based on the static analysis, the second web page of the plurality of web pages as not including the potential vulnerability;
   dynamically analyzing the first web page of the plurality of web pages using a set of test payloads per parameter tested based upon flagging the first web page as including the potential vulnerability to verify whether the potential vulnerability is a false positive;
   determining how to reproduce the potential vulnerability based on the dynamic analysis; and
   dynamically analyzing the second web page of the plurality of web pages using a subset of the set of test payloads based upon flagging the second web page as not including the potential vulnerability, the subset including fewer test payloads per parameter tested than the set of test payloads per parameter tested used for the first web page of the plurality of web pages based upon flagging the first web page as including the potential vulnerability, and wherein the subset tests for one or more common sources of vulnerabilities;
   wherein a ratio of the test payloads per parameter in the subset of the set of test payloads to the test payloads per parameter in the set of test payloads is between 1:10 and 1:200.

2. The computer program product of claim 1, further comprising instructions for receiving the plurality of web pages from a web server.

3. The computer program product of claim 1, wherein the plurality of web pages are associated with a web application.

4. The computer program product of claim 1, wherein the instructions for statically analyzing the source code of the plurality of web pages, include instructions for building a model representing a flow of data through the source code of the plurality of web pages.

5. The computer program product of claim 1, wherein the potential vulnerability includes a data-flow violation based on a set of security rules.

6. The computer program product of claim 1, wherein the instructions for statically analyzing the source code of the plurality of web pages include instructions for static taint analysis.

7. The computer program product of claim 1, wherein the instructions for dynamically analyzing include instructions for executing the script code on a script engine.

8. A system comprising:
   a processor and a memory coupled with the processor;
   one or more software modules deployed in the memory and executed on the processor, the one or more software modules, when executed on the processor is configured to perform one or more operations comprising:
   statically analyzing source code of a plurality of web pages including script code;
   identifying a first web page of the plurality of web pages as including a potential vulnerability based on the static analysis;
   identifying a second web page of the plurality of web pages as not including a potential vulnerability based on the static analysis;

flagging, based on the static analysis, the first web page of the plurality of web pages as including the potential vulnerability;

flagging, based on the static analysis, the second web page of the plurality of web pages as not including the potential vulnerability;

dynamically analyzing the first web page of the plurality of web pages using a set of test payloads per parameter tested based upon flagging the first web page as including the potential vulnerability to verify whether the potential vulnerability is a false positive;

determining how to reproduce the potential vulnerability based on the dynamic analysis; and dynamically analyzing the second web page of the plurality of web pages using a subset of the set of test payloads based upon flagging the second web page as not including the potential vulnerability, the subset including fewer test payloads per parameter tested than the set of test payloads per parameter tested used for the first web page of the plurality of web pages based upon flagging the first web page as including the potential vulnerability, and wherein the subset tests for one or more common sources of vulnerabilities;

wherein a ratio of the test payloads per parameter in the subset of the set of test payloads to the test payloads per parameter in the set of test payloads is between 1:10 and 1:200.

9. The system of claim 8, wherein the one or more operations further includes receiving the plurality of web pages from a web server.

10. The system of claim 8, wherein the plurality of web pages are associated with a web application.

11. The system of claim 8, statically analyzing the source code of the plurality of web pages includes building a model representing a flow of data through the source code of the plurality of web pages.

12. The system of claim 8, wherein the potential vulnerability includes a data-flow violation based on a set of security rules.

13. The system of claim 8, wherein statically analyzing the source code of the plurality of web pages; is conducted using static taint analysis.

14. The system of claim 8, wherein the one or more operations further includes dynamically analyzing by executing the script code on a script engine.

15. The computer program product of claim 1, wherein the subset of the set of test payloads includes between 1 to 10 test payloads per parameter and the set of test payloads includes between 100 to 200 test payloads per parameter.

16. The system of claim 8, wherein the subset of the set of test payloads includes between 1 to 10 test payloads per parameter and the set of test payloads includes between 100 to 200 test payloads per parameter.

* * * * *